(12) United States Patent
Gudmundsson et al.

(10) Patent No.: US 10,809,410 B2
(45) Date of Patent: Oct. 20, 2020

(54) METHOD AND APPARATUS FOR SIMULTANEOUS INDUCTIVE EXCITATION AND LOCATING OF UTILITIES

(71) Applicant: OPTIMAL RANGING, INC., Santa Clara, CA (US)

(72) Inventors: Thorkell Gudmundsson, San Jose, CA (US); James W. Waite, Los Gatos, CA (US); Dimitar Gargov, Merced, CA (US)

(73) Assignee: OPTIMAL RANGING, INC., Santa Clara, CA (US)

( * ) Notice: Subject to any disclaimer, the term of this patent is extended or adjusted under 35 U.S.C. 154(b) by 5 days.

(21) Appl. No.: 15/616,704

(22) Filed: Jun. 7, 2017

(65) Prior Publication Data

US 2017/0357023 A1 Dec. 14, 2017

Related U.S. Application Data

(60) Provisional application No. 62/347,814, filed on Jun. 9, 2016.

(51) Int. Cl.
*G01V 3/10* (2006.01)
*G01V 3/15* (2006.01)

(52) U.S. Cl.
CPC . *G01V 3/10* (2013.01); *G01V 3/15* (2013.01)

(58) Field of Classification Search
CPC ........ G01S 13/06; G01S 13/885; G01S 13/89; G01V 3/081; G01V 3/08; G01V 3/088; G01V 3/10; G01V 3/104; G01V 3/105; G01V 3/107; G01V 3/108; G01V 3/15; G01V 3/165; G01V 3/14

USPC .......................... 324/326, 327, 329, 334-337
See application file for complete search history.

(56) References Cited

U.S. PATENT DOCUMENTS

| | | | |
|---|---|---|---|
| 3,617,865 A | 11/1971 | Hakata |
| 4,390,836 A | 6/1983 | Bruce et al. |
| 4,600,356 A | 7/1986 | Bridges et al. |
| 4,843,324 A | 6/1989 | Humphreys, Jr. et al. |
| 5,654,637 A | 8/1997 | McNeill |
| 6,140,819 A | 10/2000 | Peterman et al. |
| 7,120,564 B2 | 10/2006 | Pacey |

(Continued)

FOREIGN PATENT DOCUMENTS

| | | |
|---|---|---|
| GB | 2220071 A | 12/1989 |
| WO | 2014093096 A1 | 6/2014 |

OTHER PUBLICATIONS

B. Candy, "Metal Detector Basics and Theory," Minelab.com, pp. 1-24.

(Continued)

*Primary Examiner* — Steven L Yeninas
(74) *Attorney, Agent, or Firm* — Haynes and Boone, LLP (57) ABSTRACT

In accordance with aspects of the current invention, a method of determining a location of a utility line includes driving one or more transmitters with a continuous wave signal; either adjusting for effects of direct coupling between the transmitters and one or more sensors mounted on the same rigid platform or different platforms or maintaining sufficient separation between a transmitter platform and a sensor platform to minimize such effects; and deriving a position of the line relative to the sensors from the measurements.

24 Claims, 3 Drawing Sheets

(56) References Cited

U.S. PATENT DOCUMENTS

| | | | |
|---|---|---|---|
| 7,154,273 B2* | 12/2006 | Mercer | E21B 47/02216 |
| | | | 324/326 |
| 7,356,421 B2 | 4/2008 | Gudmundsson et al. | |
| 7,969,137 B2* | 6/2011 | Royle | G01V 3/081 |
| | | | 324/329 |
| 8,264,226 B1* | 9/2012 | Olsson | G01V 3/15 |
| | | | 324/329 |
| 9,568,632 B2* | 2/2017 | Stolarczyk | G01V 3/12 |
| 9,612,323 B2 | 4/2017 | Ishimori | |
| 10,025,315 B2 | 7/2018 | Klinger et al. | |
| 10,105,723 B1* | 10/2018 | Olsson | B05B 12/122 |
| 10,460,523 B1* | 10/2019 | Haddy | G01V 3/081 |
| 2002/0047709 A1* | 4/2002 | Fling | G01V 3/104 |
| | | | 324/326 |
| 2003/0189427 A1 | 10/2003 | Oristaglio et al. | |
| 2005/0237061 A1 | 10/2005 | Cloutier et al. | |
| 2006/0026020 A1* | 2/2006 | Waite | G07B 15/00 |
| | | | 702/2 |
| 2006/0036376 A1 | 2/2006 | Gudmundsson et al. | |
| 2006/0055584 A1 | 3/2006 | Waite et al. | |
| 2006/0282280 A1* | 12/2006 | Stotz | G07B 15/00 |
| | | | 705/1.1 |
| 2008/0018334 A1 | 1/2008 | Reiderman | |
| 2008/0054893 A1* | 3/2008 | Humphreys | G01V 3/107 |
| | | | 324/239 |
| 2010/0001712 A1* | 1/2010 | Royle | G01V 3/08 |
| | | | 324/67 |
| 2010/0001713 A1* | 1/2010 | Royle | G01V 3/081 |
| | | | 324/67 |
| 2010/0141261 A1* | 6/2010 | Overby | G01V 3/12 |
| | | | 324/329 |
| 2010/0188088 A1 | 7/2010 | Nielsen et al. | |
| 2010/0277358 A1* | 11/2010 | Duvoisin, III | G01D 1/00 |
| | | | 342/22 |
| 2011/0156957 A1 | 6/2011 | Waite et al. | |
| 2013/0200901 A1* | 8/2013 | Olsson | G01V 3/081 |
| | | | 324/326 |
| 2013/0287125 A1* | 10/2013 | Petherick | H04B 3/04 |
| | | | 375/257 |
| 2014/0266213 A1 | 9/2014 | Olsson et al. | |
| 2014/0312903 A1* | 10/2014 | Olsson | G01V 3/102 |
| | | | 324/326 |
| 2017/0160420 A1* | 6/2017 | Olsson | G01V 3/104 |
| 2017/0307670 A1* | 10/2017 | Olsson | G01R 29/085 |
| 2017/0363764 A1 | 12/2017 | Aldridge et al. | |

OTHER PUBLICATIONS

R. Fletcher, "Practical Methods of Optimization," A Wiley-Interscience Publication, John Wiley & Sons, 1987, Book, www.wileyeurope.com.

I.S. Grant and W.R. Phillips, "Electromagnetism (2nd ed.)," Manchester Physics, John Wiley & Sons, 2008, Book.

Grewal and Andrews, "Kalman Filtering: Theory and Practice Using MATLAB," 2nd edition, Wiley, 2001, Book, pp. 1-401.

David C. Jiles, "Introduction to Magnetism and Magnetic Materials (2 ed.)", CRC Press1998, Book.

Unknown, "Laying Pipes and Cables and Meeting the Challenge of Finding Them Again Afterwards," Maritime Journal, Apr. 27, 2015, pp. 1-3, www.maritimejournal.com.

Unknown, Submarine Medium Voltage Cables, Nexans, 2013, pp. 1-3, www.nexans.co.uk.

International Search Report for PCT Application No. PCT/US2017/036483 Issued by the U.S. International Searching Authority dated Sep. 13, 2017; pp. 1-2.

Written Opinion for PCT Application No. PCT/US2017/036483 Issued by the U.S. International Searching Authority dated Sep. 13, 2017; pp. 1-8.

International Preliminary Report on Patentability for PCT Application No. PCT/US2017/036483, dated Dec. 11, 2018, pp. 1-9.

Supplementary European Search Report from 17810991.4, dated Apr. 9, 2020, pp. 1-7.

* cited by examiner

METHOD AND APPARATUS FOR SIMULTANEOUS INDUCTIVE EXCITATION AND LOCATING OF UTILITIES

RELATED APPLICATIONS

The present disclosure claims priority to U.S. Provisional Application 62/347,814, entitled "Method and Apparatus for Simultaneous Inductive Excitation and Location of Utilities, filed on Jun. 9, 2016, which is herein incorporated by reference in its entirety.

BACKGROUND

Technical Field

Embodiments of the present invention are directed towards utility location and, in particular, to the simultaneous inductive excitation and location of utilities.

Discussion of Related Art

The position of underground and underwater cable and pipeline utilities is routinely measured via the magnetic field induced when alternating current flows through the utility. This approach is used for various purposes, such as utility surveys, monitoring of depth of cover, construction and installation, dredging preparation, and fault locating. The alternating current may be injected into the utility through a direct electrical connection at an access point, may be injected through an inductive current clamp or an inductive antenna, or may be a part of the operation of the utility itself, as in the case of live power cables.

In some cases, the electrical properties of the utility may be such that current does not flow very far from the point of injection. Examples of this include utilities with strong capacitive or resistive coupling to ground and pipelines that are explicitly grounded at regular intervals for cathodic protection. In other cases, conditions may make it impractical or undesirable to inject current far from the measurement point. Examples of the former include underwater surveys that require an inductive antenna, but where both positioning and retrieval of the antenna are difficult. Increased calls for increased efficiency in covering long distances are examples of a case where positioning and retrieval of an inductive antenna is inefficient.

Solutions that currently exist for solving the problem where current is difficult to induce use pulse induction, such as that described in "Metal Detector Basics and Theory," Minelab.com; and "Laying pipes and cables and meeting the challenge of finding them again afterwards," MaritimeJournal.com, 2015. In these systems, a transmitter transmits an electromagnetic pulse in the direction of the utility, listens for a response, and analyzes the response to derive the utility position. However, these methods generally suffer from limited accuracy in cable and pipeline positioning applications due to distortion and other undesirable effects.

Therefore, there is a need for systems for better location of underground cables or pipelines.

SUMMARY

In accordance with aspects of the current invention, a line locating system can include sensors mounted on a sensor platform; transmitters mounted on a transmitter platform; and a processor driver electrically coupled to drive the transmitters and receive signals from the sensors, the processor driver both driving the transmitters with a continuous wave and processing the signals by adjusting for effects of direct coupling between the transmitters and the sensors; and deriving a position of the line relative to the rigid sensor platform.

A method of determining a location of a utility line includes driving one or more transmitters with a continuous wave signal; either adjusting for effects of direct coupling between the transmitters and one or more or maintaining sufficient separation between a transmitter platform and a sensor platform to minimize such effects; and deriving a position of the line relative to the sensors from the measurements.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 2:
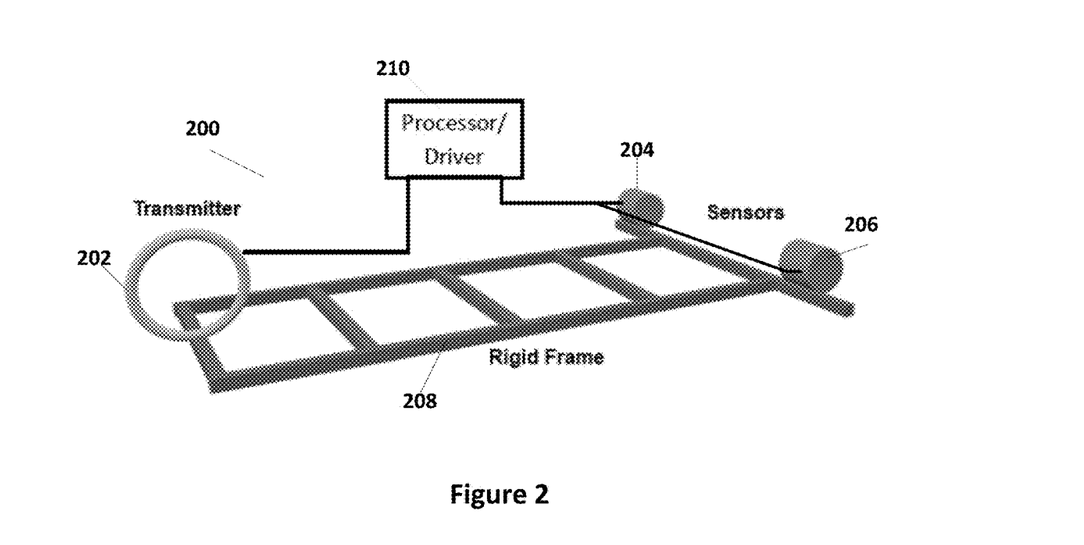
FIG. 2 illustrates an embodiment where the transmitter and sensor are mounted on a single rigid frame.
Figure 5:
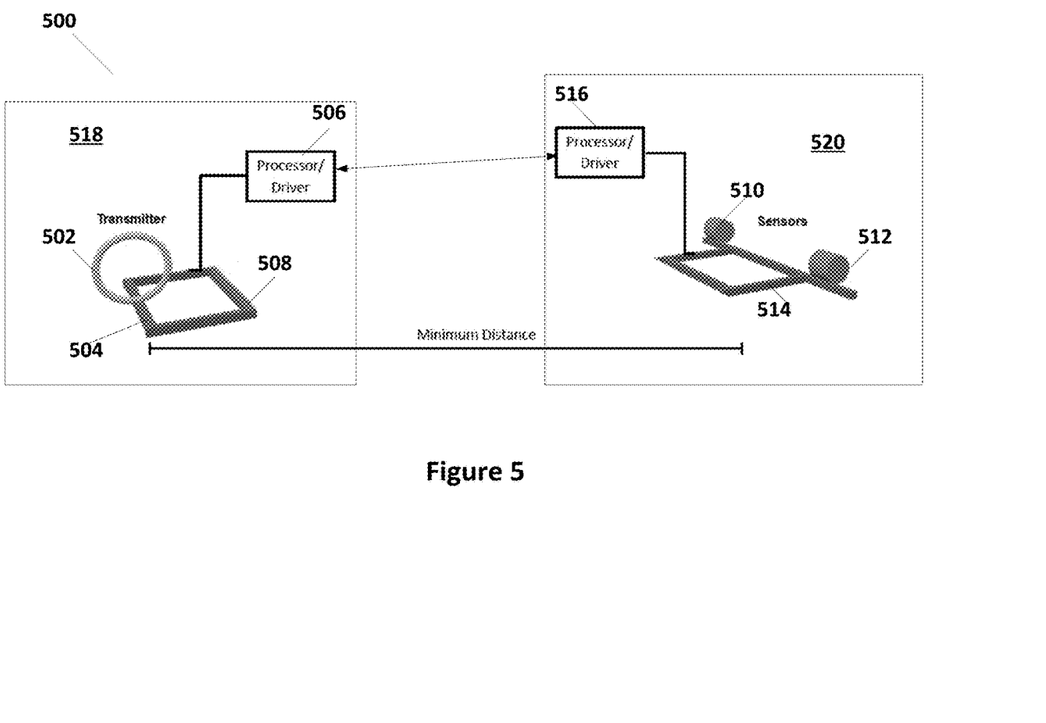
FIG. 5 illustrates an embodiment with separate platforms cooperatively to locate and track a target line.

FIGS. 2 and 5 illustrate some embodiments of the present invention. As illustrated in FIG. 2, system 200 includes sensors 204 and 206 as well as transmitter 202 mounted on a rigid frame 208. A processor/driver 210 can be coupled to control sensors 204 and 206 and transmitter 202 on rigid frame 208. Although two sensors 204 and 206 are illustrated in FIG. 2, system 200 may include any number of sensors.

Furthermore, sensors may be oriented relative to one another in order to detect magnetic fields having particular directionality. For example, detectors 204 and 206 may be oriented in orthogonal directions.

As illustrated in FIG. 5, system 500 includes a transmitter 518 and a receiver 520. Transmitter 518 includes a transmitter 502 mounted on a frame 504. Transmitter 502 is driven by a processor/driver 506. Receiver 520 includes sensors 510 and 512 mounted on a second rigid frame 514. A processor/driver 516 is coupled to driver receivers 510 and 512. Processor/driver 506 can be in communication with processor/driver 516, either by physical connection or wirelessly. As is illustrated in FIG. 5, frame 508 with transmitter 502 can be kept a minimum distance from frame 514 with sensors 510 and 512. Again, sensor 520 can have any number of sensors, of which sensors 510 and 512 are illustrated. Furthermore, the sensors on sensor 520 can be oriented to detect magnetic fields in particular directions relative to one another. For example, sensors 510 and 512 may be orthogonally placed relative to each other.

As is illustrated in the embodiments of FIGS. 2 and 5, one direct approach to addressing the issues of locating utilities is to continuously induce current from the same or different platforms that carry the positioning system itself. For example, such platforms for underwater applications include remotely operated vehicles (ROV), underwater trenchers and autonomous underwater vehicles (AUV), and all-terrain vehicles (ATV) for underground applications. In accordance with some embodiments, therefore, the position of a conducting linear structure (a cable or pipeline) can be measured using a continuous-wave induction system with one or more transmitters and one or more sensors mounted on a single rigid frame or multiple rigid frames working in relation to one another The effects of direct coupling between transmitter 202 and sensors 204 and 206, or between transmitter 502 and sensors 510 and 512 in the embodiment of FIG. 5, can be modeled and subtracted from the actual set of measurements in order to derive the position of the structure from the residual fields. The direct coupling model can be based on physical laws for magnetic induction or be empirically based on measurements. In some embodiments, the phase of the direct coupling can be measured with the sensors and the phase aligned with the phase of other sensors, using the out-of-phase component of the result to derive the position.

Continuous-wave induction often offers improved positioning accuracy, but suffers from strong direct coupling between transmitter and receiver when the two are close to each other. This coupling distorts the field measured by the receiver and significantly affects accuracy if left unaddressed. Some embodiments of the present invention provide methods for the receiver to compensate for this direct coupling by extracting the magnetic field emanating from the utility from the total measured field.

As discussed above, FIG. 2 illustrates a sensing system 200 according to some embodiments of the present invention. As illustrated in FIG. 2, sensors 204 and 206 and transmitters 202 are mounted on a rigid frame 208. The rigid frame 208 provides for separation of the sensors 204 and 206 from transmitters 202 and also provides for certainty in the relative locations of transmitters 202 and sensors 204 and 206. As is illustrated in FIG. 2, a processor/driver 210 is coupled to the transmitters 202 and the sensors 204 and 206. The processor/driver 210 includes electronics for driving the transmitters 202 and receiving signals from the sensors 204 and 206. Further, the process/driver 210 includes data processing capability sufficient to process the data received as described below. In some embodiments, the processor/driver 210 may be incorporated on the rigid frame 208. In some embodiments, the process/driver 210 may be separated from the rigid frame 208 and electronically coupled to transmitters 202 and receivers 204 and 206 mounted on the frame 208.

Another direct approach to addressing the issues of locating utilities is to separate the inducing transmitter and the positioning system by sufficient distance so that any effects of direct coupling are negligible. In this approach, the transmitter can be kept close enough to the target line to induce a measurable level of continuous current while also remaining close enough to the positioning system so that said current does not significantly diminish before reaching the positioning system. Such a system is illustrated by system 500 of FIG. 5.

In most applications, the appropriate separation distance is larger than what can be practically supported by a single platform, requiring separate platforms for the transmitter and the positioning system. In some applications, the transmitter can remain stationary while the positioning system tracks the line position for some distance, but in other applications, the transmitter has to move continuously with the positioning system. As discussed above, system 500 includes transmitters 502 on a first platform 504 while sensors 510 and 512 are mounted on a second platform 514. Platforms 504 and 514 can be kept separated by a minimum distance while each is positioned to interact with a utility.

In some applications, the location of the underground utility is not known a priori, so suitable transmitter locations or paths can be determined dynamically based on the positioning results.

FIG. 5 illustrates a system 500 according to some embodiments where inductive transmitter 502 and a positioning system 520 with sensors 510 and 512 are mounted on separate platforms 504 and 514, respectively, each operated by processor/driver 506, 516, respectively. One of the processor/drivers 506 or 516 may also provide navigational guidance to one or both platforms 506 or 516 in order to simultaneously keep the transmitter 502 sufficiently close to the target utility for efficient induction and reduce the direct path coupling to an insignificant level.

Magnetic Induction

An inductive loop antenna generates a magnetic field that is proportional to the magnitude of the current flowing in the loop and the loop area, and which predominantly behaves like a magnetic dipole anywhere except close to the loop itself (See David C. Jiles, "Introduction to Magnetism and Magnetic Materials (2 ed.)", CRC 1998; I. S. Grant and W. R. Phillips, "Electromagnetism (2nd ed.)," Manchester Physics, John Wiley & Sons, 2008).

Accordingly, the magnetic field at a position in free space defined by a vector r relative to the antenna center can be described by the following equation:

$$H_D(r) = \frac{1}{4\pi}\left(\frac{3r(m\cdot r)}{\|r\|^5} - \frac{m}{\|r\|^3}\right) \quad \text{(Eq. 1)}$$

Here, the vector m is the magnetic moment of the antenna, with magnitude equal to the product of the loop current and the loop area and direction along the primary antenna axis, and $H_D$ is magnetic field in units of A/m.

Equivalent equations can be derived for the magnetic field in a conductive medium such as seawater, but those equations are not included in this description.

Since the methods described in this document are based on continuous-wave excitation at one or more distinct frequencies, it is convenient to view both m and $H_D$ as phasors, each described by a vector of three complex values that captures the amplitude and phase of the continuous-wave field along each coordinate axis. Each component of these vectors has the same phase, but a superposition of two or more such vectors may not, as will be shown later.

As described by Faraday's law of induction (David C. Jiles, "Introduction to Magnetism and Magnetic Materials (2 ed.)," CRC 1998), the time-varying magnetic field $H_D$ will induce an electromotive force c in any closed circuit that is equal to the negative of the time rate of change of the magnetic flux enclosed by the circuit:

$$\varepsilon = -\mu_0 \frac{d}{dt} \int \int_A H_D(r, t) \cdot dA \qquad \text{(Eq. 2)}$$

In equation 2, dA is an incremental unit of area enclosed by the circuit, $\mu_0$ is the vacuum permeability, equal to $4\pi \times 10^{-7}$ Vs/(Am), and the integration is taken over the entire area enclosed by the circuit. The time-dependence of $H_D$ has been emphasized here for clarity.

Then considering that the target utility can be considered an infinitely long straight conductor and the primary antenna axis can be considered to be perpendicular to the conductor, the expression provided in Equation 2 may be simplified as:

$$\varepsilon = \frac{\mu_0 \omega \|m\|}{4\pi r} \qquad \text{(Eq. 3)}$$

Here, $\omega = 2\pi f$, where f is the frequency of the excitation signal, and r is the shortest distance from the antenna center to the conductor. A straightforward modification can be made to factor in any rotation of the antenna with respect to the conductor.

If the closed circuit has total impedance Z, then the induced current in the target conductor is given by:

$$I_L = \frac{\varepsilon}{Z} = \frac{\mu_0 \omega \|m\|}{4\pi r Z} \qquad \text{(Eq. 4)}$$

It should be noted that the impedance Z may include capacitive and inductive effects, so the phase of the current $I_L$ may be different from the phase of the magnetic field $H_D$.

Current will also be induced in other closed circuits present in the environment, including so-called eddy currents that are induced within metallic objects and other conductive materials that are in the vicinity of the transmitters.

The induced currents, including both $I_L$ and eddy currents, will in turn generate their own magnetic fields according to the Biot-Savart law. (See, e.g. David C. Jiles, "Introduction to Magnetism and Magnetic Materials 2ed.)," CRC 1998; I. S. Grant and W. R. Phillips, "Electromagnetism (2nd ed)," Manchester Physics, John Wiley & Sons, 2008. Consequently, a magnetic field sensor placed in the environment will measure the complex superposition of the magnetic fields emanating from these multiple sources, as well as the direct coupling from the transmitter.

The Biot-Savart law as applied to the target utility in free space is as indicated in Equation 5, where $I_L$ is the current on the utility, r is the measurement position vector, dx is a length element of the conductor and x is the position of that element on the conductor.

$$H_L(r) = \frac{I_L}{4\pi} \int_C \frac{dx \times (r-x)}{\|r-x\|^3} \qquad \text{(Eq. 5)}$$

As before, $H_L$ is a time-varying quantity at one or more distinct frequencies and can be represented by a complex three-dimensional vector at each frequency, with each component describing the magnitude and phase of the magnetic field along a coordinate axis.

As before, equivalent equations can be derived for the magnetic field in a conductive medium such as seawater, but those equations are not included in this description.

Figure 4:
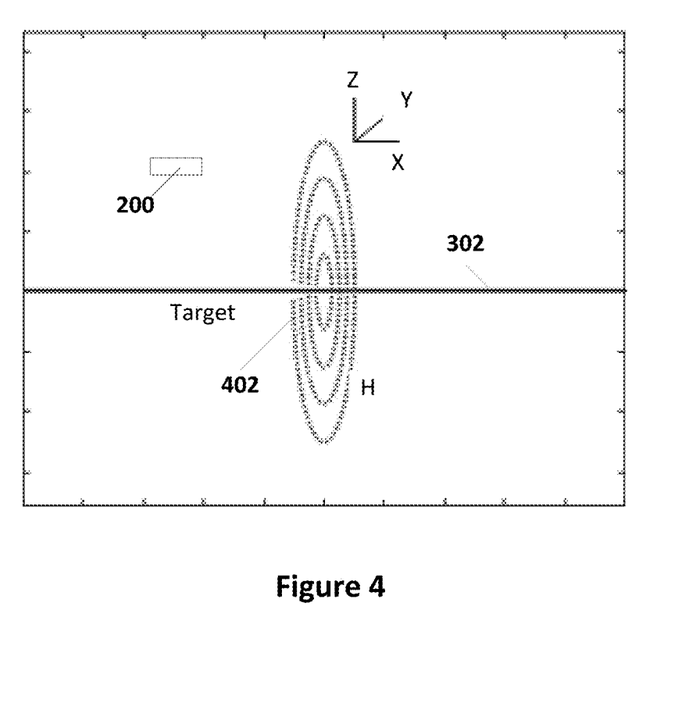
FIG. 4 illustrates the two-dimensional field lines and the sensor axes for location systems according to some embodiments.

Equation 5 can be simplified to a two-dimensional field that decays as the inverse of the distance r to the conductor, which may be represented in the conductor's coordinate system with the X-axis pointing along the conductor as shown in FIG. 4 and indicated in Equation 6.

$$H_L(r) = \frac{I_L}{4\pi} \begin{bmatrix} 0 \\ -\frac{z}{r} \\ \frac{y}{r} \end{bmatrix} \qquad \text{(Eq. 6)}$$

Here, r is the shortest distance to the conductor and y and z may be chosen as the horizontal and vertical offsets from the conductor, respectively.

Performance

Embodiments of a receiver system can substantially distinguish between the magnetic field emanating from the utility from other effects, including the direct coupling, eddy-current effects and environmental noise. The effects of unstructured environmental noise may be partially removed by appropriately filtering the measured signals, but the other effects are highly structured and may be removed by other methods.

For accurate positioning of a target utility the undesirable effects can be reduced to well below the strength of the magnetic field emanating from the utility. In some embodiments, a level of reduction of 20 dB below the target field, or to 1/10th of its strength, may be sufficient. As described in the previous section the latter depends on the position and orientation of both the transmitter antenna and the receiver's sensors as well as the impedance of the utility. Therefore, positioning of the system with respect to the conductor becomes more difficult as distance between the combined system and the utility increases and as the impedance increases.

The impedance of cable or pipeline utilities varies significantly in practice. The internal resistance and ground capacitance of high-voltage power cables are typically on the order of 0.1-1 Ω/km and 0.1-1 μF/km, respectively (see, e.g. "Nexans Submarine Power Cables," Nexans, 2013), and their ground impedance can be expected to be a few Ω At a typical induction frequency of a few kHz and for a cable a few km long this results in a few Ω total impedance. Large pipelines may have significantly lower impedance, especially if grounded at regular intervals through protective anode beds or similar methods, while utilities with higher internal resistance or poor grounding may have higher total impedance.

When a single platform, such as system 200 illustrated in the embodiment of FIG. 2, is targeted for this use, its size also varies. As an example, a cable-laying trencher may be as long as 8 m, allowing for 10 m separation between antenna and sensors, while a work-class ROV only allows a 4 m separation. The former may also allow smaller separation between the inductive antenna and the cable.

Figure 1A:
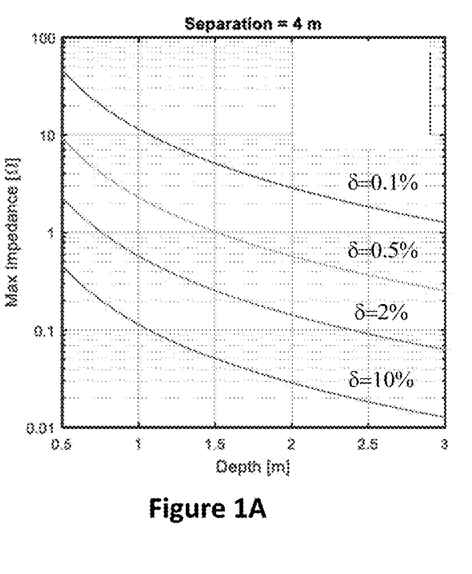
FIGS. 1A and 1B illustrate maximum target impedance for different compensation performance levels.
Figure 1B:
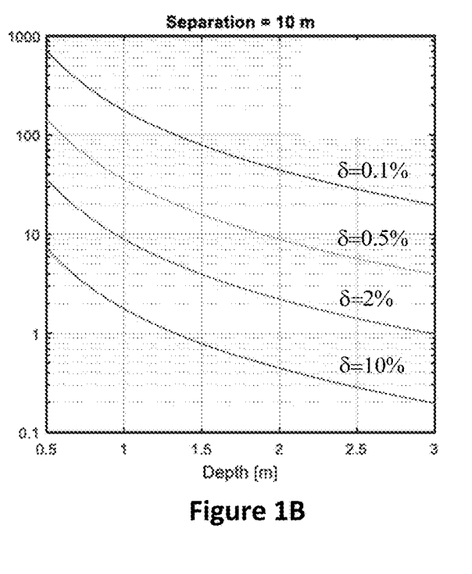

The graphs illustrated in FIG. 1 shows the maximum total impedance addressable with different performance levels at two different separation distances in order to maintain a 20 dB difference between the desired and undesired magnetic fields. The performance level is indicated by the parameter δ as a percentage of the full strength of the direct coupling between the transmit antenna and the receiver, with δ=10% indicating that 10% of the direct coupling remains, for example.

When separate platforms are used for the transmitter and the positioning system the minimum distance between the two that effectively eliminates the effects of direct coupling is typically on the order of 100 m, but this depends on both the strength of the antenna and the sensitivity of the sensors.

The rate of decay of the induced current depends on both the electrical properties of the target utility and the frequency of the inductive antenna. A fast decay may require that the two platforms be kept relatively close to each other, but slower decay may allow the separation distance to vary over a wider range.

Positioning Methods

This section outlines four methods for removing the undesirable effects of direct coupling and induced eddy currents, and three methods for deploying separated transmission and measurement. The first two are based on explicitly characterizing the distortion and then subtracting it from the aggregate measured signal, the next two rely on indirectly estimating the contribution of the target utility to the aggregate signal, and the last three focus on how a transmitter can be placed or moved while providing sufficient continuous current for the measurements to be used to locate or track a target cable. One skilled in the art may recognize other methods from the ones described herein that may also be used for removing the undesirable effects or positioning a transmitter.

In the first four cases both transmitter and receiver are assumed to be mounted on one rigid frame and therefore are useful with system 200 as illustrated in FIG. 2. As discussed above, transmitter 202 and sensors 204 and 206 are typically at opposite ends of rigid frame 208 in order to maximize the separation between the two. Depending on the application, system 200 may utilize multiple transmitters, any number of sensors 204 and 206, and may operate at multiple signal frequencies. Nonlinear solution methods such as the Levenberg-Marquardt algorithm (R. Fletcher, "Practical Methods of Optimization," Wiley, 1987) or an iterative method such as a Kalman filter (Grewal and Andrews, "Kalman Filtering," 2nd edition, Wiley, 2001) may then be applied to the resulting residual measurement to derive the position of the utility. This is described in more detail in U.S. Pat. No. 7,356,421 by T. Gudmundsson and J. Waite, "Precise Location of Buried Metallic Pipes and Cables in the Presence of Signal Distortion," which is herein incorporated by reference in its entirety.

In the latter three cases the direct coupling is ignored and the position of the utility is derived via more conventional methods, such as the ones described in U.S. Pat. No. 7,356,421.

These latter three methods all rely on finding a suitable initial location for the transmitter platform, whether it be the rigid frame 208 of FIG. 2 or platform 504 of transmitter 518, where the transmitter or transmitters are close enough to the target line to induce measurable current on it. There are multiple ways of accomplishing this depending on a priori knowledge of the line location, line conditions, available equipment and other factors.

In some embodiments, the platform may be placed near an accessible terminal, at landfall for a subsea cable, or at a section of the line that is visible.

In other embodiments, the transmitter platform 504 of transmitter 518 and the sensor platform 514 of sensor 520 may be used cooperatively to find a suitable location. If the orientation of the target line is known, cooperate use of transmitter 518 and 520 may be done by moving both platforms 504 and 514 simultaneously across the target line, noting when the largest measurement is obtained by the sensors and using that as the initial position for the transmitter platform. If the direction is not known the same procedure can be repeated at different angles until such a maximum is found.

Model-Based Estimation of Direct Coupling

When the primary cause for distortion is the direct coupling between the transmitter and receiver and other effects such as eddy-current induction are minimal, the direct coupling may be estimated directly from (Eq. 1) above or other equivalent equations. If the separation between the antenna and a sensor at position r is $r_D$, then the measured signal $H(r,r_D)$ is the sum of the direct coupling signal $H_D$ and the induced signal $H_L$, as indicated in Equation 7.

$$H(r,r_D)=H_L(r)+H_D(r_D) \quad \text{(Eq. 7)}$$

An estimate of $H_D$ can be obtained using (Eq. 1) and subtracted from the measurement to get an estimate of $H_L$.

Empirical Estimation of Direct Coupling

In some applications, it may be possible to move the entire system far enough away from the target utility to remove its effects in the measurements for a period of time. Measurements made during this period may then be used to compose an empirical model of the aggregate distortion, including amplitudes and signal phases for each sensor.

Let $H_A$ be the aggregate distortion signal. Then the measured signal can be described by Equation 8 below.

$$H(r,r_D)=H_L(r)+H_A(r_D) \quad \text{(Eq. 8)}$$

The empirical estimate of $H_A$ can be subtracted from the measured signal to obtain an estimate of $H_L$.

Differential Adjustment for Direct Coupling

In some cases, system 200 may be mounted on a single vehicle that is capable of navigating through turns and altitude changes, such as on an ROV, AUV or ATV. In those cases, a path can be chosen that continuously changes the relationship between the system and the target. The path may be predetermined or adjusted dynamically.

While the geometric relationship between the system and the target utility can be changed this way, the relationship between the transmitter antenna 202, the rigid platform 208, and the receiver sensors 204 and 206 does not change. Therefore, the distortion caused by direct coupling and eddy currents induced on the platform itself remains constant, at least for short periods of time, and subtracting measurements from two separate time instances and locations will largely cancel the effect. The remaining differential measurement can be used to derive the position of the target, for example by modeling the measured magnetic field as a function of both the sensor and antenna positions relative to the target, and solving for the latter.

Figure 3:
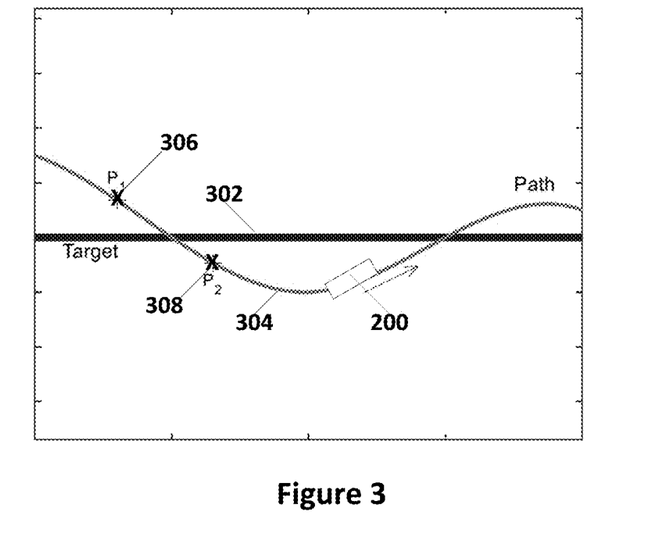
FIG. 3 illustrates an example travel path for changing the geometry between the target and sensors with the embodiment illustrated in FIG. 2.

FIG. 3 shows an example path over a target utility that can be used with system 200. The difference between measurements at points P1 and P2 illustrated in FIG. 3 can be used for positioning. For reference, FIG. 4 illustrates a coordinate system that can be used during calculations, with the X direction being along the target conductor and the Y and Z direction being orthogonal to the target conductor.

Let the two measurements at points P1 and P2 be as follows for each sensor in system 200, where $H_L$ is the magnetic field induced by the current in the target utility, $H_A$ is the aggregate of the direct coupling and any fields induced by eddy currents on the platform, $r_1$ and $r_2$ are the two measurement positions, $r_D$ is the position of the sensor relative to the antenna center, and $t_1$ and $t_2$ are the two measurement times, resulting in the measured magnetic fields $H_1$ and $H_2$ as described in Equation 9.

$$H_1(r_1,r_D,t_1)=H_L(r_1,t_1)+H_A(r_D,t_1)$$

$$H_2(r_2,r_D,t_2)=H_L(r_2,t_2)+H_A(r_D,t_2) \quad \text{(Eq. 9)}$$

The two $H_A$ terms will only differ in phase if the time difference between the measurements is small enough to avoid any significant time-varying effects. If the transmitter and receiver are synchronized, the phase difference may be removed by simply subtracting the two measurements, leaving dependence only on the desired signal from the target utility.

$$H_2(r_2,r_A,t_2)-H_1(r_1,r_A,t_1)=H_L(r_2,t_2)-H_L(r_1,t_1) \quad \text{(Eq. 10)}$$

If the transmitter and receiver are not synchronized the phase difference between the two measurement times can be tracked and used to correct one of the equations before the subtraction.

If the change in the platform's position and orientation between the two positions is known, either from the vehicle's navigation system or another independent positioning mechanism, the right-hand side can be modeled in terms of a single target position using Equation 4 and Equation 6.

Using Signal Phase to Cancel Direct Coupling

In some applications such as cable installation the orientation of the magnetic field sensors relative to the target cable may be easily controlled, allowing a sensor to be placed perpendicular to the cable. This sensor will measure only the distortion from direct coupling and induced eddy currents and can therefore be used as a phase reference for that aggregate signal.

Equation 9 and Equation 6 may be used to describe this in more detail. Let the sensor in question be placed so that it aligns with the X axis of (Eq. 6) so that it will only measure the contribution of the $H_A$ component of (Eq. 9). A measurement made by other sensors in the same location partially or fully aligned with the Y or Z axis of (Eq. 6) can be separated into two components, one phase-synchronous with X-axis measurement and the other 90° out of phase with it. If the phase of $H_L$ is substantially different than the phase of $H_A$ and the phase of $H_A$ is uniform for all directions, then this separation will result in an out-of-phase signal on the Y and Z sensors that only originates on the target utility and may be therefore be used for positioning.

As an example, FIG. 4 shows the 2-dimensional field emanating from the cable and three sensor axes. The X-axis is perpendicular to the field and can be used as a phase reference for the distortion signal while the out-of-phase components of the measurements made by sensors oriented along the Y and Z axes can be used for positioning.

In cases where the distortion signal includes multiple eddy-current sources in addition to the direct coupling the signal received by sensors in different locations may not be phase-synchronous. In those cases, the out-of-phase components from different sensor locations are not balanced in amplitude and cannot be combined directly in a positioning method. However, if the Y and Z components from each location are themselves balanced, then the ratio of the two components from (Eq. 6) may still be utilized for positioning along with knowledge of the separation between sensor locations.

Separated Platforms with Stationary Transmitters

If the electrical properties of the target utility line are such that the induced current can travel a substantial distance before decaying below an acceptable level, the transmitter platform 504 may be left in place while the sensor platform 514 is used to track the location of the line. The transmitter platform 504 can be moved to a new location periodically, for example when the measured signal level has decayed beyond an acceptable level.

A suitable initial location for the transmitter platform 504 may be found using one of the approaches described above. Subsequent locations can either be chosen in the same way or by using the line position measured by the sensor 520. The latter can be done either automatically based on the quality of that measurement, depth of burial, or other factors. Placement may also be accomplished manually by an operator.

Separated Platforms with a Predetermined Transmitter Path

If the electrical properties of the target utility line do not allow the induced current to travel very far, the transmitter 518 and sensor 520 may need to stay close to each other at all times, in some embodiments even as close as the minimum separation distance allows. In this case, both platforms 504 and 514 move in tandem, with the transmitter 518 either leading or following the sensor 520 within a range of separation distances.

If the horizontal position of the line is well known and if the platforms can be guided properly, this may be done by having the transmitter 518 follow a predetermined path, for example defined by a sequence of waypoints. Communication between the transmitter 518 and receiver 520 or between the transmitter 518, receiver 520 and a central controller may be necessary to moderate and control the speed of one or both.

Separated Platforms with a Dynamically Adjusted Transmitter Path

If the location of both platforms is known sufficiently well the measurements done by the positioning system on the sensor platform may be used to dynamically guide the transmitter platform, where the latter follows the former within a range of separation distances.

In some embodiments, the positioning system 500 continuously measures both the horizontal position and the depth of the target line and guides the transmitter 518 so that it follows at a set distance while remaining directly above the line and as low as possible.

Figure 6:
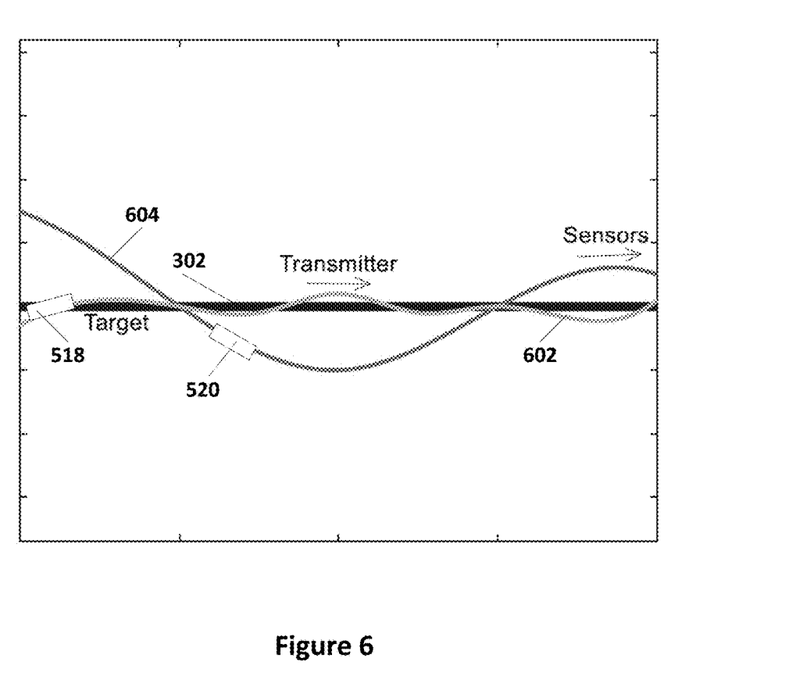
FIG. 6 illustrates an example of a transmitter platform and a sensor platform cooperatively tracing a line position.

FIG. 6 illustrates an example of this method, where the measurement area is viewed from above and the target utility line is shown as a thick blue line. The sensor 520 traces a line 604 while tracking the signal induced by transmitter 518. System 500 uses the measurement of the line position to guide transmitter 518 along a line close to target line 302, resulting in the path 602 illustrated in FIG. 6. The transmitter 518 follows the sensor 520 at a distance that is large enough so that effects of direct path coupling are not significant but close enough that current induced in target 302 is detectable by receiver 520.

The above detailed description is provided to illustrate specific embodiments of the present invention and is not intended to be limiting. Numerous variations and modifications within the scope of the present invention are possible. The present invention is set forth in the following claims.

What is claimed is:

1. A line locating system, comprising:
one or more sensors mounted on a sensor platform, the one or more sensors configured to detect a magnetic field emitted by a current along a line;
one or more transmitters mounted on a transmitter platform, the one or more transmitters configured to induce a current along the line to generate the magnetic field; and
a processor driver electrically coupled to the one or more transmitters and the one or more sensors to drive the transmitters and receive signals related to the magnetic field emitted by the current along the line from the sensors, the processor driver both driving the transmitters with a continuous wave and processing the signals by
adjusting for effects of direct coupling between the transmitters and the sensors; and
deriving a position of the line relative to the sensor platform,
wherein the processor driver includes a transmitter driver on the transmitter platform and a receiver driver on the receiver platform, the transmitter driver coupled to drive the transmitters on the transmitter platform with a continuous wave and the receiver driver coupled to receive signals from the sensors on the receiver platform, the processor driver further configured to process the signals by deriving the position of the line,
wherein the sensor platform and the transmitter platform are mobile with respect to the line,
wherein the transmitter platform and the sensor platform include navigation capabilities, one of the transmitter driver and the receiver driver has information about positions of both the transmitter platform and the sensor platform, and one of the transmitter driver and the receiver driver guides the transmitter platform along a path.

2. The system of claim 1, wherein adjusting for effects of direct coupling comprises
modeling effects of direct coupling between the transmitters and the sensors;
subtracting the effects of direct coupling from a set of measurements from the receiver to obtain a residual; and
deriving the position of the line from the residual.

3. The line locating system according to claim 2, wherein modeling the effects of direct coupling is based on physical laws of magnetic induction.

4. The line locating system of claim 2, wherein modeling the effects of direct coupling is based on empirical measurements.

5. The line locating system of claim 1, wherein the transmitter platform and the sensor platform form a single rigid frame and wherein navigation capabilities of both the transmitter platform and the sensor platform is that of the single rigid frame.

6. The line locating system of claim 5, wherein adjusting for effects of direct coupling includes
varying a position or orientation of the rigid frame relative to the line;
determining a change in the set of measurements; and
removing the effects of direct coupling based on the change in the set of measurements.

7. The line locating system of claim 5, wherein adjusting for effects of direct coupling comprises
tracking a phase of the direct coupling;
aligning the phase of other sensors to the phase of the direct coupling; and
deriving the line position includes using an out-of-phase component of the alignment.

8. The line locating system of claim 1, wherein the sensor platform and the transmitter platform are separated.

9. The line locating system of claim 8, wherein one or more locations of the transmitter platform are predetermined.

10. The line locating system of claim 9, wherein the transmitter platform is stationary at a predetermined location.

11. The line locating system of claim 9, wherein
the path of the transmitter platform is a predetermined path while maintaining a minimum distance from the sensor platform.

12. The line locating system of claim 8, wherein
one of the transmitter driver and the receiver driver uses continuously measured position of the line to dynamically determine a suitable path for the transmitter platform; and
the path of the transmitter platform is the dynamically determined path while maintaining a minimum distance from the sensor platform.

13. A method of determining a location of a line, comprising
driving one or more transmitters that are mounted on a transmitter platform with continuous wave signals to induce a current along the line;
receiving signals on one or more receivers mounted on a receiver platform, the signals related to magnetic fields emitted from the line by the current;
adjusting for effects of direct coupling between the one or more transmitters and the one or more sensors;
deriving a position of the line relative to the receiver platform, and
guiding the transmitter platform along a path,
wherein the transmitter platform and the receiver platform each include navigation capabilities and are moveable relative to the line, one of the transmitter driver and the receiver driver has information about the position both the transmitter platform and the sensor platform.

14. The method of claim 13, wherein the transmitter platform and the receiver platform form a single rigid platform and wherein navigation capabilities of both the transmitter platform and the sensor platform is that of the single rigid frame.

15. The method of claim 14, wherein adjusting for effects of direct coupling includes varying a position or orientation of the rigid frame relative to the line, determining a change in the set of measurements, and removing the effects of direct coupling based on the change in the set of measurements.

16. The method of claim 14, wherein adjusting for effects of direct coupling includes tracking a phase of the direct coupling and aligning the phase of other sensors to the phase of the direct coupling.

17. The method of claim 16, wherein deriving the position includes using an out-of-phase component of the alignment.

18. The method of claim 13, wherein adjusting for effects of direct coupling comprises modeling effects of direct coupling between the one or more transmitters and the one or more sensors;

subtracting the effects of direct coupling from a set of measurements from the one or more receiver to obtain a residual; and wherein deriving the position of the line involves deriving the position from the residual.

19. The method of claim 18, wherein modeling effects of direct coupling is based on physical laws of magnetic induction.

20. The method of claim 18, wherein modeling effects of direct coupling is based on empirical measurements.

21. The method of claim 13, wherein the transmitter platform and the receiver platform are separate.

22. The method of claim 21, wherein the transmitter platform is stationary at a predetermined location.

23. The method of claim 21, wherein guiding the transmitter platform along the path includes guiding the transmitter platform along a predetermined path while maintaining a minimum distance from the sensor platform.

24. The method of claim 21, further including dynamically determining in one of the transmitter driver and the receiver driver a suitable path for the transmitter platform from the measured positions of the line; and wherein guiding the transmitter platform along the path includes guiding the platform along the suitable path while maintaining a minimum distance from the sensor platform.

* * * * *